United States Patent
Gyoten et al.

(10) Patent No.: US 6,638,655 B2
(45) Date of Patent: Oct. 28, 2003

(54) FUEL CELL SYSTEM

(75) Inventors: Hisaaki Gyoten, Shijonawate (JP); Osamu Sakai, Neyagawa (JP); Kazuhito Hatoh, Osaka (JP); Junji Niikura, Hirakata (JP); Makoto Uchida, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 343 days.

(21) Appl. No.: 09/829,465

(22) Filed: Apr. 10, 2001

(65) Prior Publication Data

US 2001/0036567 A1 Nov. 1, 2001

(30) Foreign Application Priority Data

Apr. 13, 2000 (JP) ........................................ 2000-111732

(51) Int. Cl.[7] ................................................ H01M 8/12
(52) U.S. Cl. ........................ 429/26; 429/24; 429/20; 429/32; 429/34; 429/38; 429/39
(58) Field of Search ............................. 429/12, 20, 24, 429/26, 32, 34, 38, 39

(56) References Cited

U.S. PATENT DOCUMENTS

| | | | | |
|---|---|---|---|---|
| 4,678,724 A | * | 7/1987 | McElroy | 429/34 |
| 5,382,478 A | * | 1/1995 | Chow et al. | 429/26 |
| 5,503,944 A | * | 4/1996 | Meyer et al. | 429/26 |
| 6,197,442 B1 | * | 3/2001 | Gorman | 429/34 |
| 6,358,639 B2 | * | 3/2002 | Oko et al. | 429/34 |
| 6,399,234 B2 | * | 6/2002 | Bonk et al. | 429/32 |
| 6,413,663 B1 | * | 7/2002 | Mercuri | 429/39 |

FOREIGN PATENT DOCUMENTS

| | | |
|---|---|---|
| JP | 61173467 A | 8/1986 |
| JP | 61188865 A | 8/1986 |
| JP | 01132063 A | 5/1989 |
| JP | 02-017941 A | 1/1990 |
| JP | 02126568 A | 5/1990 |
| JP | 02-311302 A | 12/1990 |
| JP | 04004572 A | 1/1992 |
| JP | 06014006 A | 1/1994 |
| JP | 08-083991 A | 3/1996 |
| JP | 09002271 A | 1/1997 |

* cited by examiner

*Primary Examiner*—Bruce F. Bell
(74) *Attorney, Agent, or Firm*—Akin, Gump, Strauss, Hauer & Feld, L.L.P.

(57) ABSTRACT

The invention provides a fuel cell system that is free from troubles due to contaminant ions by controlling the concentration of contaminant ions in cooling water. The fuel cell system comprises a fuel cell stack and a means for controlling the cell temperature by circulating a liquid coolant in the fuel cell stack or bringing it in contact with the fuel cell stack, the fuel cell stack comprising a plurality of unit cells that are laid one upon another, each of the unit cells comprising a hydrogen ion-conductive electrolyte membrane, a pair of gas diffusion electrodes which sandwich the electrolyte membrane, an anode-side conductive separator plate having a gas flow path for supplying a fuel gas to one of the electrodes, and a cathode-side conductive separator plate having a gas flow path for supplying an oxidant gas to the other of the electrodes, wherein a material adsorbing or absorbing ions is provided on a portion of the fuel cell system to come in contact with the liquid coolant.

7 Claims, 3 Drawing Sheets

F I G. 1
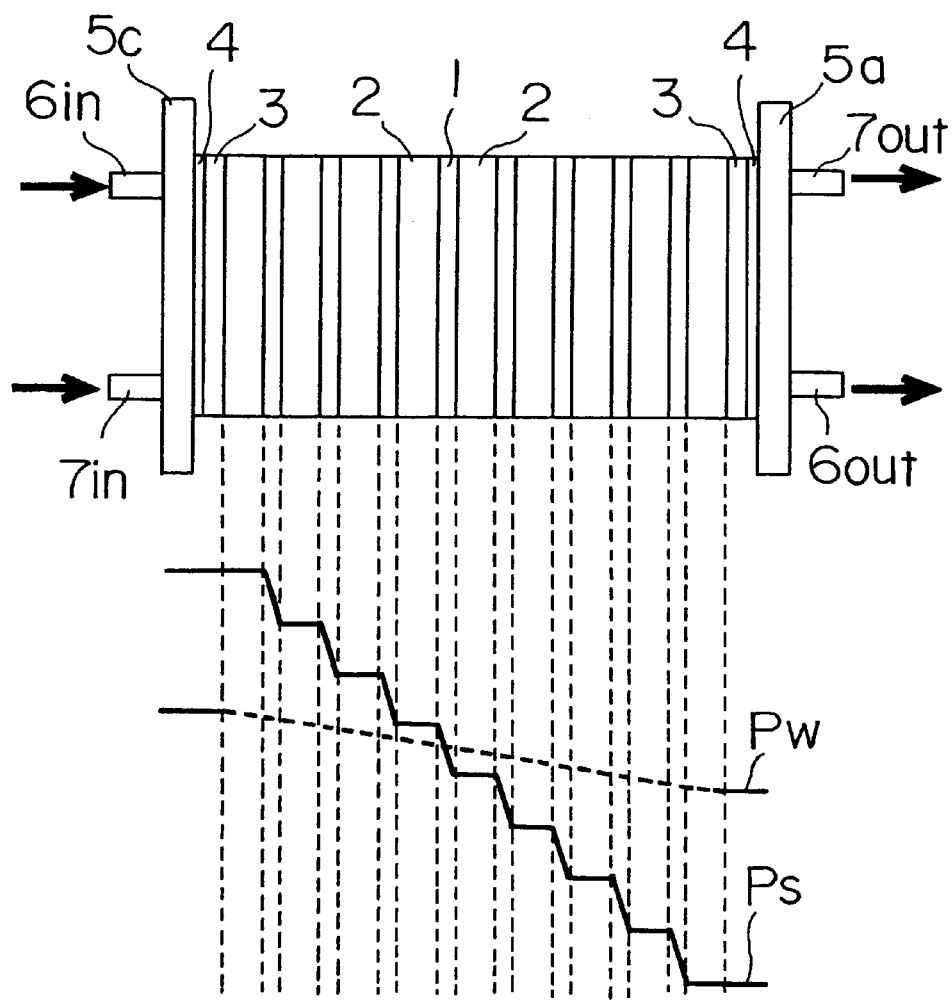

FUEL CELL SYSTEM

BACKGROUND OF THE INVENTION

The present invention relates to a fuel cell that is useful for domestic cogeneration systems and portable power sources, particularly to a polymer electrolyte fuel cell in which a polymer is employed as an electrolyte.

The fuel cell generates electricity and heat simultaneously by electrochemically reacting a fuel such as hydrogen and an oxidant gas such as air at gas diffusion electrodes, and there are several kinds of fuel cells that employ different electrolytes and operating temperatures. Among these fuel cells, the polymer electrolyte fuel cell dominantly uses, as a polymer electrolyte, fluorocarbon polymer with a sulfonic acid group introduced as a side chain terminal group. An electrode reaction layer mainly composed of a carbon powder carrying a platinum group metal catalyst is formed on each side of an electrolyte membrane composed of the above-mentioned material in such a manner as to closely adhere to the electrolyte membrane. Further, a pair of conductive porous sheet materials, having both gas permeability and electric conductivity, is formed on outer surfaces of the electrode reaction layers in such a manner as to closely adhere thereto. The conductive porous sheet material and the electrode reaction layer constitute a gas diffusion electrode.

Disposed outside the gas diffusion electrodes are electrically conductive separator plates for mechanically securing the assembly of the electrodes and the electrolyte membrane and connecting adjacent assemblies electrically in series. A portion of the separator plate to come in contact with the electrode is provided with a gas flow path for supplying a reaction gas to the electrode surface and removing a generated gas and an excess gas. Gas sealing materials such as gasket or sealant are arranged on peripheral portions of the electrodes and the separator plates having a gas flow path, preventing two kinds of reaction gases from mixing together or leaking to outside.

As an ordinary power source, the fuel cell is configured to have a stacked structure, i.e., as a fuel cell stack where a plurality of unit cells, each comprising an electrolyte membrane, electrode reaction layers and separator plates, are stacked and a fuel gas such as hydrogen and an oxidant gas such as air are supplied to respective gas flow paths through manifolds from outside. Current generated at the electrode reaction layers is collected by the conductive porous sheet materials, passed through the separator plates, and taken to outside. The separator plate is often composed of a carbon material having electric conductivity, gas tightness and corrosion resistance, but a metallic separator made of stainless steel or other metals is also used since this separator has good forming workability, is low-cost, and can be made thinner.

The fuel cell stack is configured to circulate cooling water or antifreeze inside the cell stack in order to control the cell temperature, since heat is also generated during power generation utilizing the electrochemical reaction. It is common that the cooling water, when heated by this heat, is cooled by a heat exchanger which is disposed outside the cell stack such that it is again circulated therein.

In the fuel cell stack, the cooling water passes through a manifold for cooling water from the heat exchanger disposed outside, and then flows through a cooling unit having a flow path of the cooling water provided every 1 to several unit cells, thereby cooling the unit cells. The cooling water then passes through another manifold and returns to the heat exchanger. In the fuel cell stack of the conventional construction, materials of the cooling water circulation path corrode during operation of the cell stack, causing deterioration of cell performance and a gas leak. Also, corrosion causes dissolution of ions into the cooling water out of these materials and the ionic conductivity of the cooling water is thereby raised, so that there has also been a problem with respect to safety against a leakage of current in case of gas evolution in the cooling water and a water leak.

Further, in order to maintain a high ion-conductivity of the electrolyte, the conventional fuel cell stack needs to reduce contaminant ions from outside, particularly the concentration of ions dissolved in steam and humidifying water included in reaction gases. Thus, it needs addition of pure water to the humidifying water or replacement of the humidifying water.

BRIEF SUMMARY OF THE INVENTION

In view of the foregoing, an object of the present invention is to provide a fuel cell system that is free from troubles caused by impurity ions by suppressing the corrosion of a portion of the fuel cell system to come in contact with cooling water and reducing the concentration of impurity ions in the cooling water.

Another object of the present invention is to provide a fuel cell system that is capable of maintaining the ionic conductivity of the electrolyte at a high level by reducing the concentration of ions dissolved in steam and humidifying water included in reaction gases.

In the present invention, a material adsorbing or absorbing impurity ions in cooling water is provided on a cooling water circulation path in order to suppress the corrosion of members of the cell system and prevent the concentration of impurity ions from rising. This can eliminate the problems that the cell performance is lowered by a current flowing in the cooling water and the safety is not secured in case of a water leak.

The present invention provides a fuel cell system comprising a fuel cell stack and a means for controlling the cell temperature by circulating a liquid coolant in the fuel cell stack or bringing it in contact with the fuel cell stack, the fuel cell stack comprising a plurality of unit cells that are laid one upon another, each of the unit cells comprising a hydrogen ion-conductive electrolyte membrane, a pair of gas diffusion electrodes which sandwich the electrolyte membrane, an anode-side conductive separator plate having a gas flow path for supplying a fuel gas to one of the electrodes, and a cathode-side conductive separator plate having a gas flow path for supplying an oxidant gas to the other of the electrodes, wherein a material adsorbing or absorbing ions is provided on a portion of the fuel cell system to come in contact with the liquid coolant.

It is preferable that the material adsorbing or absorbing ions adsorbs or absorbs ions at a speed or in an amount which is dependent on a potential difference between the liquid coolant and the material.

It is preferable that the material adsorbing or absorbing ions is electrically connected to the fuel cell stack and has a potential which is dependent on a potential of the connected portion of the fuel cell stack with respect to the liquid coolant, i.e., a potential that is almost equal or proportional to a potential of the connected portion of the fuel cell stack with respect to the liquid coolant.

It is preferable that the material adsorbing or absorbing ions comprises an intercalation material composed of carbon or a metal oxide.

As the liquid coolant, water or an organic liquid having a hydroxyl group is preferably used.

It is also possible to further comprise a means which is disposed on a flow path of the liquid coolant for intermittently applying a potential to the material adsorbing or absorbing ions.

The present invention also provides a fuel cell system comprising a fuel cell stack and a humidifying means for humidifying a reaction gas with steam, the fuel cell stack comprising a plurality of unit cells that are laid one upon another, each of the unit cells comprising a hydrogen ion-conductive electrolyte membrane, a pair of gas diffusion electrodes which sandwich the electrolyte membrane, an anode-side conductive separator plate having a gas flow path for supplying a fuel gas to one of the electrodes, and a cathode-side conductive separator plate having a gas flow path for supplying an oxidant gas to the other of the electrodes, wherein a material adsorbing or absorbing ions is disposed so as to be in contact with humidifying water of the humidifying means with a potential applied by the fuel cell stack.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a view illustrating the potentials of separator plates and cooling water in relation to the positions of members of a fuel cell stack.

DETAILED DESCRIPTION OF THE INVENTION

Figure 2:
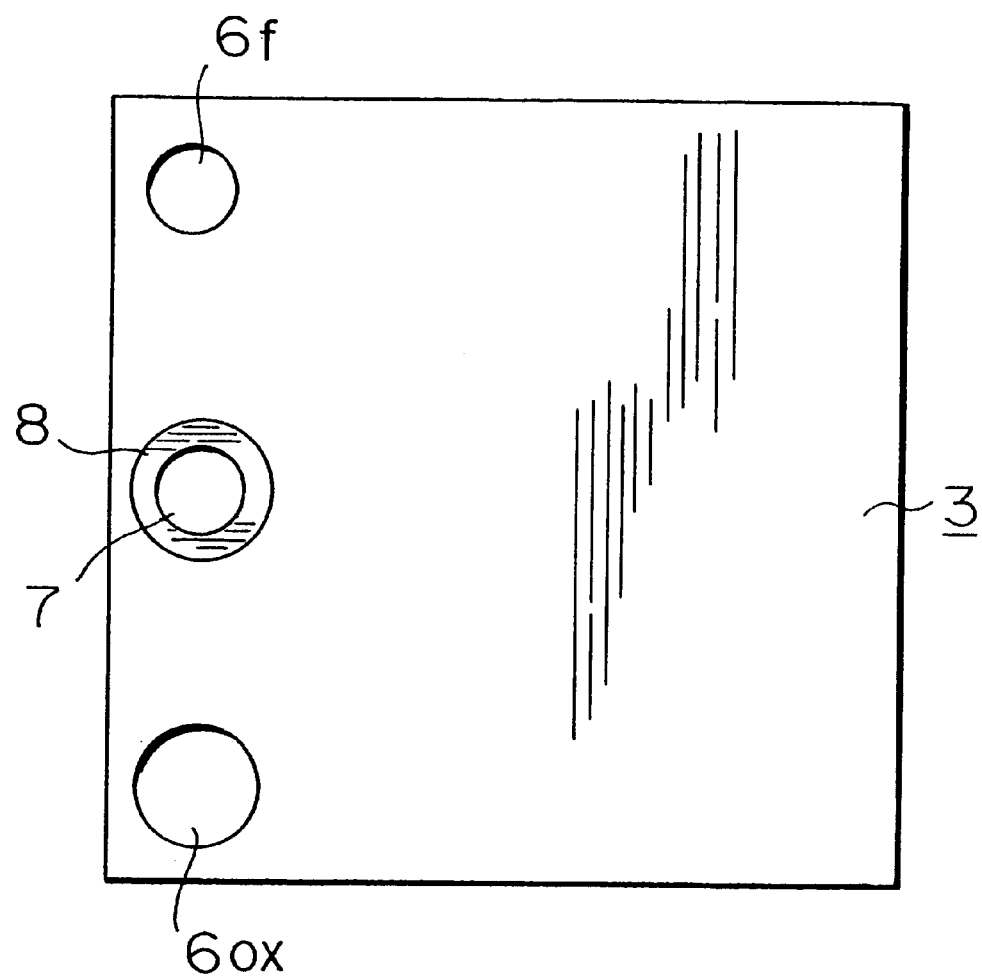
FIG. 2 is a front view illustrating manifolds of a current collector plate used in examples of the present invention.

The present invention will be described in detail referring to FIG. 1.

FIG. 1 shows a schematic structure of a fuel cell stack. Numeral 1 represents an electrolyte membrane-electrode assembly (hereinafter referred to as MEA) comprising a polymer electrolyte membrane and a pair of gas diffusion electrodes sandwiching the polymer electrolyte membrane. The MEAs and electrically conductive separator plates 2 are stacked alternately to form a stack of fuel cells. At each end of this stack of fuel cells, an end plate 5 is disposed with a current collector plate 3 and an insulating plate 4 interposed therebetween, and these cell members are unitarily clamped, for example, with bolts and nuts. A plurality of unit cells are electrically connected in series by electrically conductive separator plates 2, and reaction gases and cooling water are prevented from leaking out of the bonded portions of cell members. An end plate 5c is provided with an inlet $6_{in}$ of a reaction gas and an inlet $7_{in}$ of cooling water, while an end plate 5a is provided with an outlet $6_{out}$ of the reaction gas and an outlet $7_{out}$ of the cooling water. In FIG. 1, only one inlet and one outlet are illustrated for reaction gases, but each of a fuel gas and an oxidant gas has an inlet and an outlet.

The separator plate 2 has a gas flow path for supplying the oxidant gas to a gas diffusion electrode (cathode) on one face thereof, for example, on the right side in FIG. 1, and has a gas flow path for supplying the fuel gas to a gas diffusion electrode (anode) on the other face thereof, except for the separator plate located at the end of the stack of fuel cells. The separator plate 2 further has a cooling water flow path for cooling the cells, for example, every 2 cells. In FIG. 1, although each of the separator plates 2 is illustrated as one plate, the separator plate commonly comprises a cathode-side separator plate and an anode-side separator plate.

The cooling water enters a fuel cell stack from the inlet $7_{in}$ of cooling water of the end plate 5c and passes through the flow path of the separator plate 2 every 2 cells while cooling the cells. Thereafter, it comes out of the outlet $7_{out}$ of the end plate 5a and enters a heat exchanger, where it is cooled by heat exchange so that it is again supplied to the fuel cell stack. In such a cooling water circulation path, the cooling water comes in contact with electrically conductive cell members such as separator plate. Also, the cooling water or antifreeze initially has a low ion-conductivity since pure water or the like is used. However, during a long-period operation of the fuel cell stack, ions dissolve out of metallic materials, resin materials and the separator plates which constitute the cooling water circulation path, so that the cooling water has an increasingly high ion-conductivity. FIG. 1 illustrates the potential of the separator plates Ps and the potential of the cooling water Pw in relation to the positions of members of the fuel cell stack. When the ionic conductivity of the cooling water becomes high as described above, ions contained in the cooling water move in such a manner that the potential of the cooling water Pw could become uniform throughout the cooling water circulation path. Thus, at the cathode-side end of the fuel cell stack, that is, at the end plate 5c side, cell members have a much higher potential than the cooling water, while on the anode side, that is, at the end plate 5a side, cell members have a lower potential than the cooling water.

The cell members such as separator plate are composed of carbon or metal. Thus, when they have a higher potential than the cooling water, cations dissolve into the cooling water out of the carbon and metal ions dissolve into the cooling water out of the metallic cell members. As a result, the ionic conductivity of the cooling water becomes further higher, and the potential of the cooling water Pw as shown in FIG. 1 thus becomes more flat, so that the potential difference between the cell members constituting the end of the fuel cell stack and the cooling water becomes further higher, accelerating the corrosion of the cell members.

The present invention is based on the results of the research for the mechanism of the corrosion as described above. That is, inclusion of ions into the cooling water due to some reasons during operation of the fuel cell stack raises the ionic conductivity of the cooling water, increasing the potential difference between the cooling water and the material adsorbing or absorbing ions which is provided so as to come in contact with the cooling water. As the material adsorbing or absorbing ions, the present invention uses carbon materials or metal oxide materials having a layered crystal structure which absorb or desorb ions when a potential is applied. In case of using such a material, the material absorbs anions in the cooling water when the potential difference between the material and the cooling water becomes larger than a certain level, and the material desorbs cations such as metal ions which are dissolved in the cooling water as impurities when the potential difference becomes smaller than a certain level. As a result, the ionic conductivity of the cooling water is constantly kept at a low level and the corrosion of the cell members is also suppressed. A representative example of the material adsorbing or absorbing impurity ions in the cooling water depending on the potential is the so-called intercalation material.

In the polymer electrolyte fuel cell, it is necessary to remove metal ions also from the water and device for humidifying the reaction gases, since inclusion of metal ions into the electrolyte membrane decreases the ionic conductivity of the electrolyte membrane, resulting in deterioration of cell performance. However, the present invention is configured so as to bring the material adsorbing or absorbing impurity ions in contact with the humidifying water while applying a potential to the material in the same manner as in the case of the cooling water, so that it is possible to keep the concentration of metal ions or contaminant ions in the humidifying water and steam at a low level over a long period.

In the following, examples of the present invention will be described in detail.

EXAMPLE 1

A carbon powder with a platinum catalyst carried thereon was dispersed in an alcohol solution of a polymer electrolyte to yield a slurry. Meanwhile, carbon paper having a thickness of 200 $\mu$m, which was the material of gas diffusion electrodes, was impregnated with an aqueous dispersion of polytetrafluoroethylene (PTFE), dried and then thermally treated to obtain a water-repellent conductive porous sheet material. The polymer electrolyte slurry containing the carbon powder with a platinum catalyst was applied to one face of the conductive porous sheet material and dried, to obtain a gas diffusion electrode having an electrode reaction layer on one face thereof. An electrolyte membrane was sandwiched by a pair of the gas diffusion electrodes in such a manner that the respective electrode reaction layers of the electrodes were in contact with the electrolyte membrane. The resultant assembly was hot pressed at 110° C. for 30 seconds to obtain an electrolyte membrane-electrode assembly (MEA). As the sheet material of the gas diffusion electrode, it is also possible to use a flexible material such as carbon cloth produced by weaving carbon fibers and carbon felt produced by mixing carbon fibers and a carbon powder and forming the mixture with an organic binder in addition to the carbon paper used in this example.

A separator plate was produced as follows: A carbon plate prepared by molding a carbon powder material by cold pressing was impregnated with phenol resin and the resin was cured, which gave a resin-impregnated carbon plate with improved gas sealing property. This carbon plate was then provided with a gas flow path by cutting working. On the periphery of the gas flow path of the separator plate, there were formed manifold apertures for supplying and discharging a gas and a manifold aperture for supplying and discharging cooling water for controlling the cell temperature. A metallic separator plate, in which a similar gas flow path and manifold apertures were provided on a plate of stainless steel SUS304 by cutting working, was also prepared in addition to the carbon separator plate.

The following will describe a cell stack of a fuel cell system in accordance with this example. The MEA having an electrode area of 25 cm$^2$ was provided with gaskets composed of silicon rubber as a gas sealing material on the periphery thereof. The MEA was then interposed between a pair of the separator plates to form a unit cell, and 10 unit cells were stacked. The separator plate having a cooling water flow path was disposed every 2 unit cells such that the cells could be cooled. A pair of stainless steel end plates was mounted outside the stack of unit cells with a current collector plate composed of gold-plated copper and an insulating plate interposed therebetween, and this cell stack was clamped with a pressure of 20 kgf/cm$^2$ from both ends. As shown in FIG. 2, the current collector plate 3 was provided with a manifold for a fuel gas $6_f$ and a manifold for an oxidant gas $6_{ox}$, and a manifold for the cooling water 7. The manifold for the cooling water 7 was provided with a ring 8 produced by molding a carbon powder.

The carbon powder used for the ring 8 was different from the carbon material of the separator plate; instead, this example employed the carbon powder used for the lithium ion battery, i.e., the carbon powder capable of intercalating/deintercalating lithium ions electrochemically. This carbon powder was added with an organic binder and molded into a ring, and the resultant rings were fitted to the manifolds 7 of the current collector plates at both ends of the cell stack. The cell stack prepared in the above-described manner was combined with a gas supply system for supplying gases, a power output system for setting and controlling the load current to be collected from the cell stack, and a heat control system for controlling the cell temperature and effectively utilizing exhaust heat, to form a fuel cell system. Experiments were conducted using fuel cell systems thus prepared.

Figure 3:
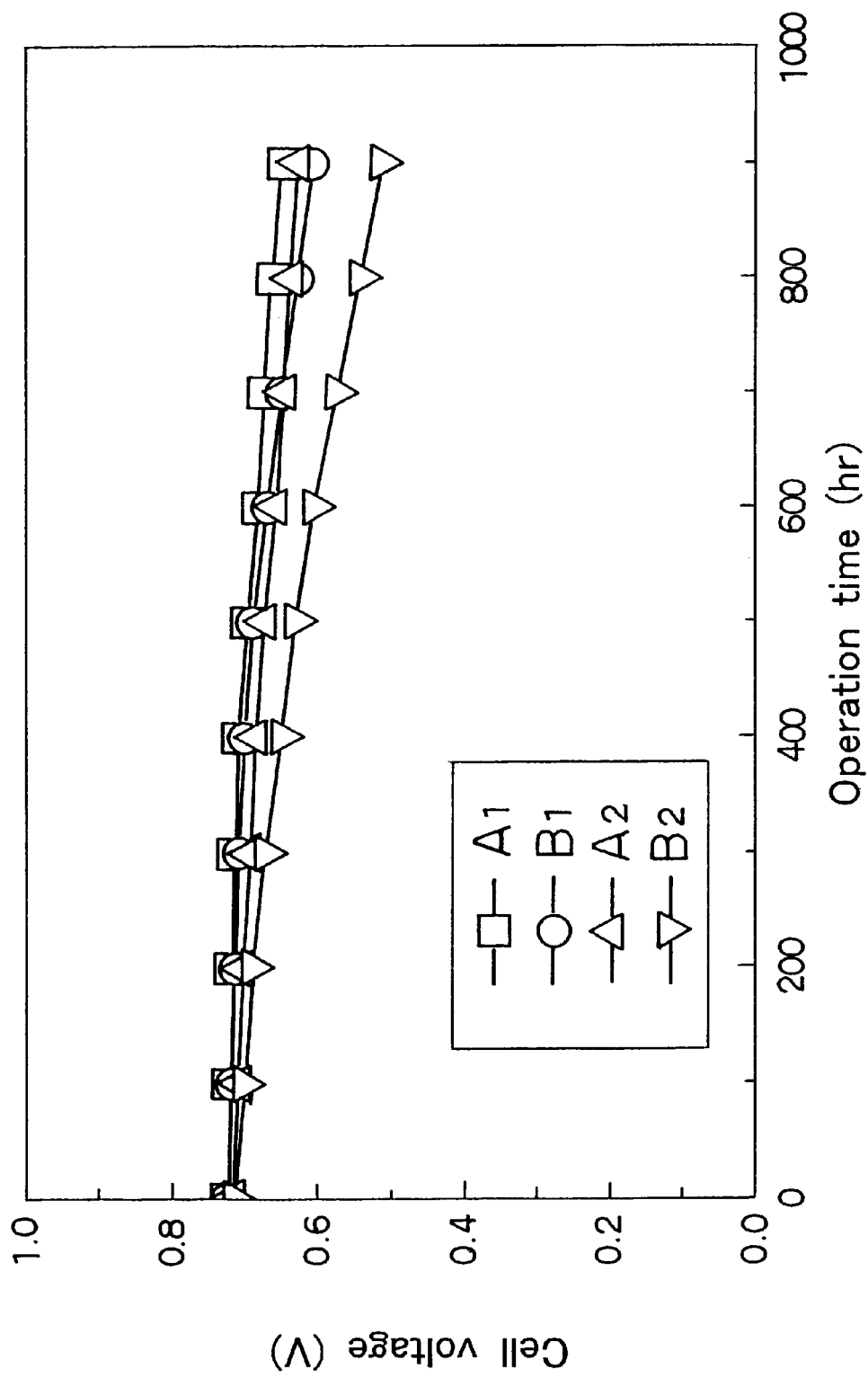
FIG. 3 is a graph showing the changes of cell voltages when fuel cell stacks are continuously operated.

A continuous battery test was conducted at a current density of 0.3 A/cm$^2$ and a gas utilization of 70% for hydrogen and 40% for air. Herein, the gas utilization shows in what ratio a gas reacts with the electrode relative to a supplied gas. In this test, the cell temperature was 75° C., pure hydrogen and air were supplied as a supply gas, the supply pressure was 0.2 kgf/cm$^2$ for air and 0.05 kgf/cm$^2$ for hydrogen, and the outlet was open to the atmosphere. Pure water was used as the cooling water. Cell systems were operated continuously to examine their durability, and the changes of cell performances and ionic conductivity of the cooling water were examined. FIG. 3 shows the changes of cell voltages and the operation time of the cell systems. In the figure, A1 is a cell system of this example with a carbon separator plate, B1 a cell system of comparative example with a carbon separator plate, A2 a cell system of this example with a metallic separator plate, and B2 another cell system of comparative example with a metallic separator plate. FIG. 3 clearly shows that the cell systems in accordance with the present invention, both with a carbon separator plate and with a metallic separator plate, could maintain a higher cell performance than the cell systems in accordance with the prior art.

In this test, the performances of the cell systems with a metallic separator plate deteriorated faster than the cell systems with a carbon separator plate for the following reasons: First, the electrolyte was estimatedly contaminated with a larger amount of metal ions. Second, metal ions are considered to have dissolved into the cooling water out of the metallic separator plate. The cell system of B2 with a metallic separator plate having deteriorated performance was decomposed and analyzed, and this analysis showed advanced corrosion of the edges of the manifolds of the separator plates in the vicinity of the ends of the cell stack. Also, the ionic conductivity of the cooling water was tracked and it was found that the cooling water of the cell systems with a metallic separator plate had a higher ion-conductivity than those with a carbon separator plate. However, in the fuel cell systems of the present invention where the carbon material absorbing contaminant ions was provided on the manifolds of the current collector plates on both ends thereof, it was confirmed that the ionic conductivity of the cooling water could be maintained at a low level over a long period of time, in both cases of using a carbon and metallic separator plates.

It was found that the provision of the ion-absorbing material on the current collector plates reduced the potential difference between the cooling water and the current collector plates on both ends of the cell stack so that the potential difference between the cooling water and the cell members was kept at a low level in all parts of the fuel cell stack.

Next, the effects obtained in case of providing the ion-absorbing material on the current collector plate on one end of the cell stack were examined. Effects were acknowledged in both cases of providing the ion-absorbing material on the current collector plate on either end of the cell stack; however, when the carbon material used for the anode of the lithium ion battery in accordance with this example was used as the ion-absorbing material, a better cell performance was obtained after a long-time operation in a case of providing the material on the current collector plate on the anode side than in a case of providing the material on the current collector plate on the cathode side. This is estimatedly because the carbon material used in this examination was a material appropriate for absorbing lithium ions which are cations. There are also carbon materials suitable for absorbing anions and such materials are preferably provided on the cathode side.

Herein, description was given on the example of providing the ion-absorbing material on the manifold for the cooling water on the current collector plate, but it is needless to say that the fuel cell system is also expected to have improved performance in durability when the material is provided on the whole separator plates or the manifolds for the cooling water on the separator plates in the vicinity of the ends of the cell stack.

Further, as a result of the examination on the relationship between the volume of the ion-absorbing material and the time for which the ionic conductivity of the cooling water was kept at a low level, it was found that the larger the volume became, the longer the effect lasted. Also, it was found that the larger the volume became, the more contaminant ions the material could absorb.

EXAMPLE 2

This example examined a system in which a material absorbing contaminant ions was provided outside the fuel cell stack. This system enables replacement of the ion-absorbing materials when the cell system is operated for a certain time and the material suffers from deterioration of the ion-absorbing ability.

An ion-absorbing unit which absorbs contaminant ions and purifies the cooling water was provided on an inlet of the cooling water circulation path into the cell stack and an outlet of the cooling water circulation path from the cell stack. A flow path composed of the ion-absorbing material used in Example 1 was formed on the ion-absorbing unit such that a potential could be applied to the flow path from the current collector plate of the fuel cell stack. The flow path was configured to have a fin-structure such that it could come in contact with the cooling water in a larger area. As a result, it was found that the ionic conductivity of the cooling water was prevented from rising over a long period and the durability of this cell system was thus maintained in the same manner as in Example 1. Further, how to apply a potential was also examined. As a result, it was found that the potential was not necessarily required to be applied by the direct electrical connection with the current collector plate. Also, it was found that, even when the potential was not continuously applied during the operation of the cell system, an application of the potential for a certain time, for example, for about three hours once in ten days, was effective. Thereafter, it was confirmed that the contamination of the cooling water was improved to a certain extent by just bringing the ion-absorbing material in contact with the cooling water without applying the potential thereto.

EXAMPLE 3

The function of purifying the cooling water, which was confirmed in Example 2, was also applied to purification/clarification of humidifying water. First, a bubbler tank was arranged before the air supply side of a fuel cell stack with a metallic separator plate. The bubbler tank was filled with distilled water, and a portion of the bubbler tank to come in contact with the distilled water was coated with Teflon in order to prevent ions from dissolving into the distilled water out of the walls of the tank. Further, a steam condenser was disposed behind the air discharge side of the fuel cell stack in order to collect excess steam in an off gas. The collected condensed water was supplied to the bubbler tank in order to prevent the tank from running out of water.

A rod comprising the ion-absorbing material used in Example 1 and a platinum plate were inserted in the tank and immersed in the distilled water. A cell system thus prepared was operated while a voltage of about 2 V was applied between the platinum plate and the rod comprising the ion-absorbing material in such a manner as to make the ion-absorbing material negative. For comparison, a cell system with a conventional bubbler tank was also tested. As a result, after a 3000-hour operation, the performance of the cell system with the conventional bubbler tank deteriorated to almost half of the performance at the start of the operation. In contrast, the performance of the cell system of this example lowered only by 10%. In the cell system with the conventional construction, the metal ions dissolved out of the metallic separator plates were returned to the bubbler tank through the steam condenser and rarely discharged to outside, so that the electrolyte membrane was increasingly contaminated. On the other hand, in the cell system of this example, the metal ions were removed in the bubbler tank, so that the contamination of the electrolyte membrane was suppressed.

Besides the bubbler tank, it was found that it was also effective to provide the ion-absorbing material on a humidifier of total enthalpy heat exchange type having a wet membrane in such a manner as to come in contact with the wet membrane.

EXAMPLE 4

The above examples used the carbon material applied to the lithium ion battery as the ion-absorbing material, but this example examined the use of metal oxides. First, an oxide of manganese, cobalt or nickel was molded with an organic binder into a ring and then baked. In the same manner as in Example 1, a continuous battery test was conducted with fuel cell systems in which a ring of one of the metal oxides was provided on the manifolds of the current collector plates. An X-ray diffraction showed that the main component of the manganese oxide had a spinel-structure.

The results of the battery test showed that any of the cell systems had an improved durability in comparison with the conventional cell system. That is, in an accelerated test conducted with a current density of 0.7 A/cm$^2$, the cell voltages per 1 cell after 1000 hours were 0.495 V in the conventional cell system, 0.589 V in the cell system with the manganese oxide, and 0.576 V in the cell system with the cobalt oxide, and 0.572 V in the cell system with the nickel oxide. These cell systems had an initial performance of 0.620 V. Accordingly, in the cell systems including a metal oxide as the ion-absorbing material, their performances were greatly improved in comparison with that of the conventional system although they gradually deteriorated. An ionic analysis of the cooling water showed that the total amount of ions dissolved in the cooling water could be suppressed, but that the amount of metal ions derived from the ion-absorbing material increased in the cooling water. Further, in order to raise the conductivity of these baked metal oxides, a ring was produced by adding flaky graphite to the metal oxides and baking the mixture. As a result, the cell performances after a 1000-hour operation were improved by about 10 to 20 mV than those without the addition of the flaky graphite.

EXAMPLE 5

In the above examples, water was used as the coolant for circulating in the cell stack, but it is common in actual batteries to add a solvent such as ethylene glycol to water for making the coolant antifreeze, in order to prevent destruction of the cell stack caused by freezing of the coolant at low temperatures. Thus, a similar experiment was conducted using cooling water including about 50% of ethylene glycol. In the same manner as in Example 1, a molded ring made of carbon powder used for the lithium battery was provided on the manifolds of the current collector plates as the ion-absorbing material.

The results of the experiment showed that the cell system of this example had a durability equivalent to that of the cell system employing pure water as the coolant. It is clear that the ion-absorbing material is also effective when a liquid having a hydroxyl group such as ethylene glycol is used as the coolant.

As described above, the present invention can improve the durability of the solid polymer electrolyte fuel cell and prevent a leakage of current due to cell voltage even when a leakage of cooling water occurs, so that the invention has large applicability.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fuel cell system comprising a fuel cell stack and a means for controlling the cell temperature by circulating a liquid coolant in said fuel cell stack or bringing it in contact with said fuel cell stack, said fuel cell stack comprising a plurality of unit cells that are laid one upon another, each of said unit cells comprising a hydrogen ion-conductive electrolyte membrane, a pair of gas diffusion electrodes which sandwich said electrolyte membrane, an anode-side conductive separator plate having a gas flow path for supplying a fuel gas to one of the electrodes, and a cathode-side conductive separator plate having a gas flow path for supplying an oxidant gas to the other of the electrodes, wherein a material adsorbing or absorbing ions is provided on a portion of the fuel cell system to come in contact with said liquid coolant.

2. The fuel cell system in accordance with claim 1, wherein said material adsorbing or absorbing ions adsorbs or absorbs ions at a speed or in an amount which is dependent on a potential difference between said liquid coolant and said material.

3. The fuel cell system in accordance with claim 2, wherein said material adsorbing or absorbing ions is electrically connected to the fuel cell stack and has a potential which is dependent on a potential of the connected portion of the fuel cell stack with respect to said liquid coolant.

4. The fuel cell system in accordance with claim 1, wherein said material adsorbing or absorbing ions comprises carbon or a metal oxide.

5. The fuel cell system in accordance with claim 1, wherein said liquid coolant comprises water or an organic liquid having a hydroxyl group.

6. The fuel cell system in accordance with claim 1, further comprising a means which is disposed on a flow path of said liquid coolant for intermittently applying a potential to said material adsorbing or absorbing ions.

7. A fuel cell system comprising a fuel cell stack and a humidifying means for humidifying a reaction gas with steam, said fuel cell stack comprising a plurality of unit cells that are laid one upon another, each of said unit cells comprising a hydrogen ion-conductive electrolyte membrane, a pair of gas diffusion electrodes which sandwich said electrolyte membrane, an anode-side conductive separator plate having a gas flow path for supplying a fuel gas to one of the electrodes, and a cathode-side conductive separator plate having a gas flow path for supplying an oxidant gas to the other of the electrodes, wherein a material adsorbing or absorbing ions is disposed so as to be in contact with humidifying water of said humidifying means with a potential applied by said fuel cell stack.

* * * * *